US012462371B2

(12) United States Patent
Atlan et al.

(10) Patent No.: US 12,462,371 B2
(45) Date of Patent: Nov. 4, 2025

(54) COMPUTER-IMPLEMENTED METHOD AND APPARATUS FOR CHARACTERIZING A FLEXIBLE TUBE

(71) Applicants: INSTITUT NATIONAL DE LA SANTE ET DE LA RECHERCHE MEDICALE, Paris (FR); CENTRE LEON BERARD, Lyons (FR); UNIVERSITÉ CLAUDE BERNARD LYON 1, Villeurbanne (FR); CENTRE NATIONAL DE LA RECHERCHE SCIENTIFIQUE, Paris (FR); CENTRE HOSPITALIER NATIONAL D'OPHTALMOLOGIE QUINZE-VINGTS, Paris (FR)

(72) Inventors: Michael Atlan, Paris (FR); Stefan Catheline, Lyons (FR); Gabrielle Laloy-Borgna, Lyons (FR); Léo Puyo, Lübeck (DE)

(73) Assignees: INSTITUT NATIONAL DE LA SANTE ET DE LA RECHERCHE MEDICALE (INSERM)—RAISON SOCIALE OBSOLETE, Paris (FR); CENTRE LEON BERARD, Lyons (FR); UNIVERSITE CLAUDE BERNARD LYON 1, Villeurbanne (FR); CENTRE NATIONAL DE LA RECHERCHE SCIENTIFIQUE, Paris (FR); CENTRE HOSPITALIER NATIONAL D'OPTHALMOLOGIE QUINZE-VINGTS, Paris (FR)

( * ) Notice: Subject to any disclaimer, the term of this patent is extended or adjusted under 35 U.S.C. 154(b) by 51 days.

(21) Appl. No.: 18/563,087

(22) PCT Filed: May 25, 2022

(86) PCT No.: PCT/EP2022/064318
§ 371 (c)(1),
(2) Date: Nov. 21, 2023

(87) PCT Pub. No.: WO2022/248613
PCT Pub. Date: Dec. 1, 2022

(65) Prior Publication Data
US 2024/0242331 A1    Jul. 18, 2024

(30) Foreign Application Priority Data
May 28, 2021    (EP) .................................. 21305715

(51) Int. Cl.
*G06T 7/00*    (2017.01)
*A61B 3/12*    (2006.01)
(Continued)

(52) U.S. Cl.
CPC .......... *G06T 7/0006* (2013.01); *A61B 3/1241* (2013.01); *A61B 5/4851* (2013.01);
(Continued)

(58) Field of Classification Search
CPC ................. G06T 7/0006; G06T 7/0012; G06T 2207/30104; G06T 2207/30181;
(Continued)

(56) References Cited

U.S. PATENT DOCUMENTS 6,081,643 A * 6/2000 Lentink .................... G21K 1/06
385/130
12,144,674 B2 * 11/2024 Weinberg ............. A61B 8/0883
(Continued)

FOREIGN PATENT DOCUMENTS

WO    2015/189174 A2    12/2015

OTHER PUBLICATIONS

Puyo et al: "In vivo laser Doppler holography of the human retina", arxiv.org, Cornell University Library, Apr. 25, 2018.

*Primary Examiner* — Bo Joseph Peng
(74) *Attorney, Agent, or Firm* — WCF IP

(57) ABSTRACT

This computer-implemented method allows assessing the shear elasticity modulus of a flexible tube, such as a blood vessel. In the field of medicine, this allows assessing whether a blood vessel is at risk of breakage or tearing. In the case of an artificial tube to be implanted in a patient's body, this allows verifying that this tube is compatible with the patient's body. The method includes the following (Continued)

further steps: a) obtaining (1002) a first dataset relating to spatiotemporal deformations of the tube; b) detecting and storing (1004) a wall inner surface of the tube and its diameter (D); c) identifying (1006) a number of transverse sections (Sij) of the tube; d) computing (1008) an average particle velocity (Vij) over each section; e) computing (1010) a wave propagation speed (C2) of an antisymmetric wave (W2); f) based on the wave propagation speed (C2) and on the diameter (D), assessing (1012) the shear elasticity modulus ($\mu$) of the tube.

16 Claims, 5 Drawing Sheets

(51) Int. Cl.
   *A61B 5/00* (2006.01)
   *A61B 8/00* (2006.01)
   *A61B 8/06* (2006.01)
(52) U.S. Cl.
   CPC .............. *A61B 8/06* (2013.01); *A61B 8/488* (2013.01); *G06T 7/0012* (2013.01); *G06T 2207/30104* (2013.01); *G06T 2207/30181* (2013.01)

(58) Field of Classification Search
   CPC ....... A61B 3/1241; A61B 5/4851; A61B 8/06; A61B 8/488; A61B 3/12; A61B 3/10
   See application file for complete search history.

(56) References Cited

U.S. PATENT DOCUMENTS

| | | | |
|---|---|---|---|
| 2007/0213645 A1* | 9/2007 | Zumeris | A61L 2/025 607/116 |
| 2010/0169062 A1* | 7/2010 | Linn | G06F 30/20 703/2 |
| 2013/0030329 A1* | 1/2013 | Zumeris | A61B 1/00131 601/2 |
| 2014/0011240 A1* | 1/2014 | Lipkens | B01D 21/283 435/71.1 |
| 2015/0148675 A1* | 5/2015 | Haupt | A61B 8/5223 600/438 |
| 2015/0208915 A1* | 7/2015 | Schallek | A61B 3/1241 351/246 |
| 2019/0302000 A1* | 10/2019 | Lo | G01J 3/0229 |
| 2019/0365336 A1* | 12/2019 | Wagner | G06T 5/94 |

* cited by examiner

COMPUTER-IMPLEMENTED METHOD AND APPARATUS FOR CHARACTERIZING A FLEXIBLE TUBE

TECHNICAL FIELD OF THE INVENTION

The present invention relates to a computer implemented method for characterizing a flexible tube, based on image data of a pulsatile flow of liquid flowing within such a tube. The invention also relates to an apparatus for implementing such a method. Finally, the invention relates to a process for assessing the health condition of a patient

BACKGROUND OF THE INVENTION

Collecting image data from blood vessels is known from an article published in BIOMEDICAL OPTICS EXPRESS (vol. 9, no 9, 1 sept. 2018, pages 4113-4129) entitled "In vivo laser Doppler holography of the human retina" by Puyo et al. This article discloses a use of holography to perform laser Doppler perfusion imaging of human retina blood vessels with near-infrared light. Laser Doppler holography allows obtaining precise images of blood flow within blood vessels. However, it does not allow quantifying mechanical properties of the blood vessels, insofar as each image is specific of the patient and of the conditions for obtaining the image and insofar as no logic link has been shown between the blood flow pattern visible on an image and the mechanical properties of a blood vessel.

Another article published in OPTICS LETTERS (vol. 45, no 14, 15 Jul. 2020, pages 4012-4015) entitled "Reverse contrast laser Doppler holography for lower frame rate retinal and choroidal blood flow imaging" by Puyo et al. suggests that laser Doppler holography might be promising for identifying blood flow within vessels. On the other hand, an article published online by ELSEVIER MASSON (IRBM 39 (2018), 1 Feb. 2018, pages 236-242) entitled "Shear-Wave Sources for Soft Tissues in Ultrasound Elastography" by Giammarinaro et al. gives a panorama of sources usable in ultrasound Elastography, when this technique is implemented as an imaging tool for soft-tissue characterization in the human body.

With the known techniques, only an image or a set of images of blood flow is obtained and it does not allow knowing the mechanical properties of the blood vessels. Thus, even if impressive, the images do not really help assessing the health condition of a patient, in particular at the level of the fundus of the eye.

The same kind of problem occurs when one needs to know the mechanical properties of a flexible tube, such as a tube used to connect an artificial heart to the vascular system of a patient. Indeed, in such a case, it would be appropriate to know if such an artificial flexible tube has mechanical properties comparable to the blood vessels of a patient. No tool is available for this.

On the other hand, scientists study the earth's crust, in particular at the level of volcano chimneys, which may be approximated as flexible tubes where lava propagates in the form of a pulsatile flow. Obtaining some information on the flexibility of such a tube could allow better knowing the composition and mechanical properties of the earth's crust around the volcano chimney. However, current techniques do not allow assessing the flexibility of such a tube.

The invention aims at solving these problems by providing a new method, which is efficient for characterizing a flexible tube, to the point that it allows assessing a shear elasticity modulus of this tube.

SUMMARY OF THE INVENTION

To this end, the present invention relates to a computer-implemented method for characterizing a flexible tube, said method including at least the following further steps:
a) obtaining a first dataset of image data relating to spatiotemporal deformations of the tube, on a given period of time;
b) detecting a wall inner surface of the tube and its diameter and storing the corresponding data in a second dataset;
c) identifying a number of transverse sections of the tube in the dataset;
d) computing, for each section of the tube and at a given instant during the given period of time, an average particle velocity over this section;
e) based on the average particle velocity computed at step d), computing a wave propagation speed of an antisymmetric wave generated in the tube by the liquid flowing within the tube;
f) based on the wave propagation speed computed at step e) and on the diameter detected at step b), assessing a shear elasticity modulus of the flexible tube.

Thanks to the invention, the different steps a) to f) of the method allow assessing the shear elasticity modulus of the flexible tube, which is an objective data that can be compared to reference values, on the basis of spatiotemporal deformations of the tube. In the meaning of the invention, "spatiotemporal deformations" stands for localized and temporary deformations. The shear elasticity modulus is a mechanical property and characterizes the tube. Based on the value of the shear elasticity modulus, the method allows detecting whether or not the flexible tube can perform its function of forming a duct for a flow of liquid. In the field of medicine, this allows in particular assessing whether a blood vessel is at risk of breakage or tearing. For other applications, for instance in the case of an artificial tube to be implanted in a patient's body, this method allows verifying that this tube is compatible with the patient's body. In the field of geology, this method allows better knowing the earth's crust.

According to further advantageous aspects of the invention, this method might incorporate one or several of the following features:

Step b) is implemented by detecting a zone of maximum gradient of intensity in images of the set of image.

Step e) is implemented by correlating some variations of the average particle velocity over a length of the tube or over time.

Step e) includes at least the following sub-steps consisting in:
e1) based on a spatial correlation scheme, determining at least one wavelength of the antisymmetric wave;
e2) based on a temporal correlation scheme, determining at least one period of the antisymmetric wave;
e3) based on the wavelength and period determined in sub-steps e1) and e2), computing the wave propagation speed.

The spatial correlation scheme of sub-step e1) has a succession of peaks and the wavelength is determined in sub-step e1) as a distance between two adjacent peaks.

Step e) is implemented by detecting, at two different given instants, a transverse section where the average particle velocity has a maximum value and computing the wave propagation speed on the basis of the distance between the two detected transverse sections and a time difference between the two instants.

Step f) consists in computing the shear elasticity modulus (u) based on of the following equation:

$$\mu = 76 \times C2^4 \times f2^{-2}/D^2$$

where: C2 is the wave propagation speed of the antisymmetric wave W2;
f2 is a representative frequency of the antisymmetric wave; and
D is the diameter of the tube T Alternatively, step f) consists in computing the shear elasticity modulus (u) based on of the following equation:

$$C2^2 = \frac{2\pi}{\sqrt{3}} \sqrt{\frac{\mu}{\rho}} \left(1 - \frac{\mu}{\alpha}\right)^{\frac{1}{2}} f2 \times D$$

where: C2 is the wave propagation speed of the antisymmetric wave W2;
f2 is a representative frequency of the antisymmetric wave;
α is a compression elasticity modulus of the tube;
ρ is the volume mass of the tube; and
D is the diameter of the tube T The data set obtained at the first step relates to a pulsatile flow of liquid flowing within the tube and is preferably implemented by laser Doppler holography or Doppler ultrasound.

The tube is a blood vessel and the liquid flowing within the tube is blood.

The blood vessel is located in the fundus of the eye and the step of obtaining the first dataset occurs through the lens of the eye.

The tube is a manufactured flexible pipe, configured to be implanted in a patient body for replacing a blood vessel.

The tube is a volcano chimney and the liquid flowing within the tube is lava.

According to a second aspect, the invention relates to an apparatus for implementing a method as mentioned hereabove. This apparatus includes
a laser source emitting a laser beam;
a beam divider for dividing the laser beam between an illumination beam and a reference beam;
a set of converging lenses;
a polarizing beam splitter for illuminating a region where the flexible tube is located;
a beam splitter for combing a light backscattered by the flexible tube with the reference beam and forming a combined beam;
at least a camera for recording images formed in the combined beam; and representative of spatiotemporal deformations of the flexible tube and
a processing unit configured for implementing the method according to any preceding claim, based on the images recorded by the camera.

Advantageously, this apparatus also includes a memory for storing at least the first and second datasets.

According to a third aspect, the invention relates to a process for assessing the health condition of a patient based on the elasticity of one of his/her blood vessels, wherein a practitioner takes into account the value of the shear elasticity modulus of the blood vessel characterized with a method of the invention or by using an apparatus according the invention and wherein the practitioner compares the value of shear elasticity modulus to a reference value.

BRIEF DESCRIPTION OF THE DRAWINGS

The invention will be better understood, based on the following description, which is given in correspondence with the appended figures and as an illustrative example, without restricting the object of the invention.

In the annexed figures.

DETAILED DESCRIPTION OF SOME EMBODIMENTS

Figure 1:
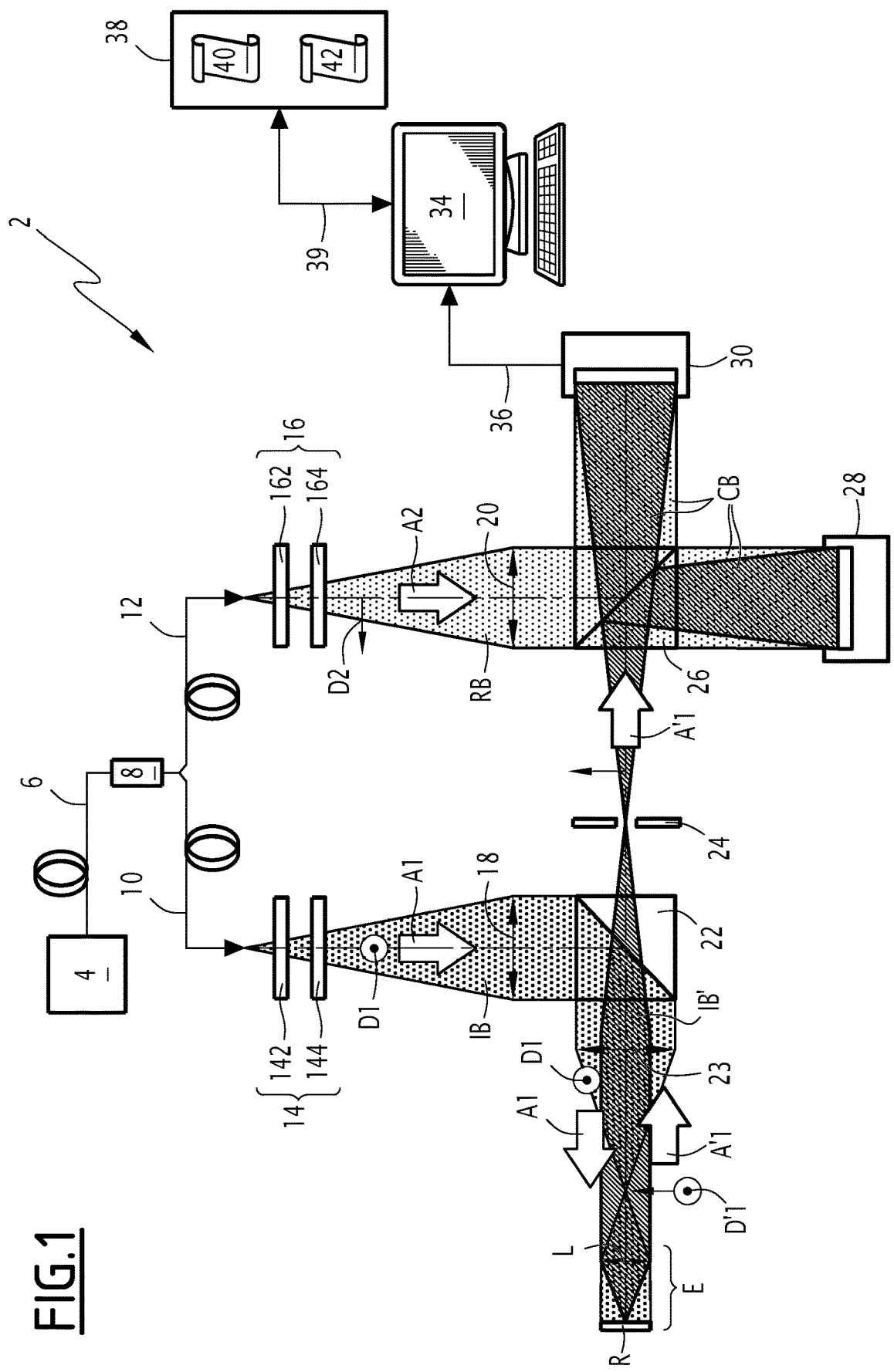
FIG. 1 is a schematic diagram of an apparatus according to the invention, used for obtaining image data useful for the invention and for treating this data according to the method of the invention.

The apparatus 2 represented on FIG. 1 includes a laser source 4 which, in this example, is a laser diode with a wavelength of 785 nanometers (nm). The laser source 4 is connected by a fiber 6 to a beam divider 8, also known as a "coupler" which divides the laser beam coming from fiber 6 into two beams respectively directed to a first downstream fiber 10 and to a second downstream fiber 12. The beam divider 8 is configured to direct 90% of the incoming beam in the first downstream fiber 10 and 10% in the second downstream fiber 12.

A first filter 14 made of a half-wave plate 142 and a linear polarizer 144 is used to generate an illumination beam IB travelling in the direction on arrow A1 on FIG. 1, with a polarization direction perpendicular to the plane of FIG. 1, as shown by its polarization direction D1.

Another filter 16 is made of a half-wave plate 162 and a linear polarizer 164. This allows generating a reference beam RB travelling in the direction of arrow A2 and having a polarization direction D2 parallel to the plane of FIG. 1.

Converging lenses 18 and 20 are respectively arranged on the path of the illumination beam IB and of the reference beam RB.

The illumination beam IB is directed to a polarizing beam splitter or PBS 22, which directs the illumination beam towards the retina R of an eye E of a patient, through its natural lens L.

The backscattered or reflected illumination beam IB' propagates in the direction of arrows A'1, with a polarization direction D'1, and crosses the PBS 22 and a diaphragm 24.

A converging lens 23 is arranged between the PBS and the natural lens L of the patient's eye E. The illumination beam IB and the backscattered beam IB' cross this converging lens 23, respectively before and after crossing the natural lens L.

A beam splitter or BS 26 is arranged on the path of the reference beam RB and of the backscattered beam IB' and combines them into a combined beam CB directed towards a slow CEMOS camera 28, which has a working frequency of about 80 Hz, and towards a fast CEMOS camera 30, which has a working frequency of about 80 KHz.

The slow camera 28 is used to visualize the retina of the patient and, if necessary adjust the settings of the apparatus 2. The fast camera is used for, at successive instants defined by its working frequency, collecting images of the retina, based on the combined beam CB.

The components of the apparatus 2 described here-above are the same as, and configured similarly to, the ones of the optical setup described in the first article by Puyo et al mentioned here-above, whose content is incorporated here by reference.

A computer unit 34 is connected to the fast camera 30 by a data conveying line 36 and forms a processing unit.

In addition, the computer unit 34 is equipped with a programmable memory 38 where a first data set 40 is stored. This data set 40 includes images collected by the fast camera 30 and representative of the pulsatile flow of blood within arteries and/or veins of the retina R. This data set is representative of the spatiotemporal deformations of the blood vessel due to the pulsatile flow of blood.

On FIG. 1, for the sake of clarity, the memory 38 is represented outside the computer unit 34 and connected to this unit via a data conveying line 39. In practice, the memory 38 may be incorporated in the computer unit 34.

The method of the invention occurs automatically in the computer unit 34, using data stored in the memory 38.

Figure 7:
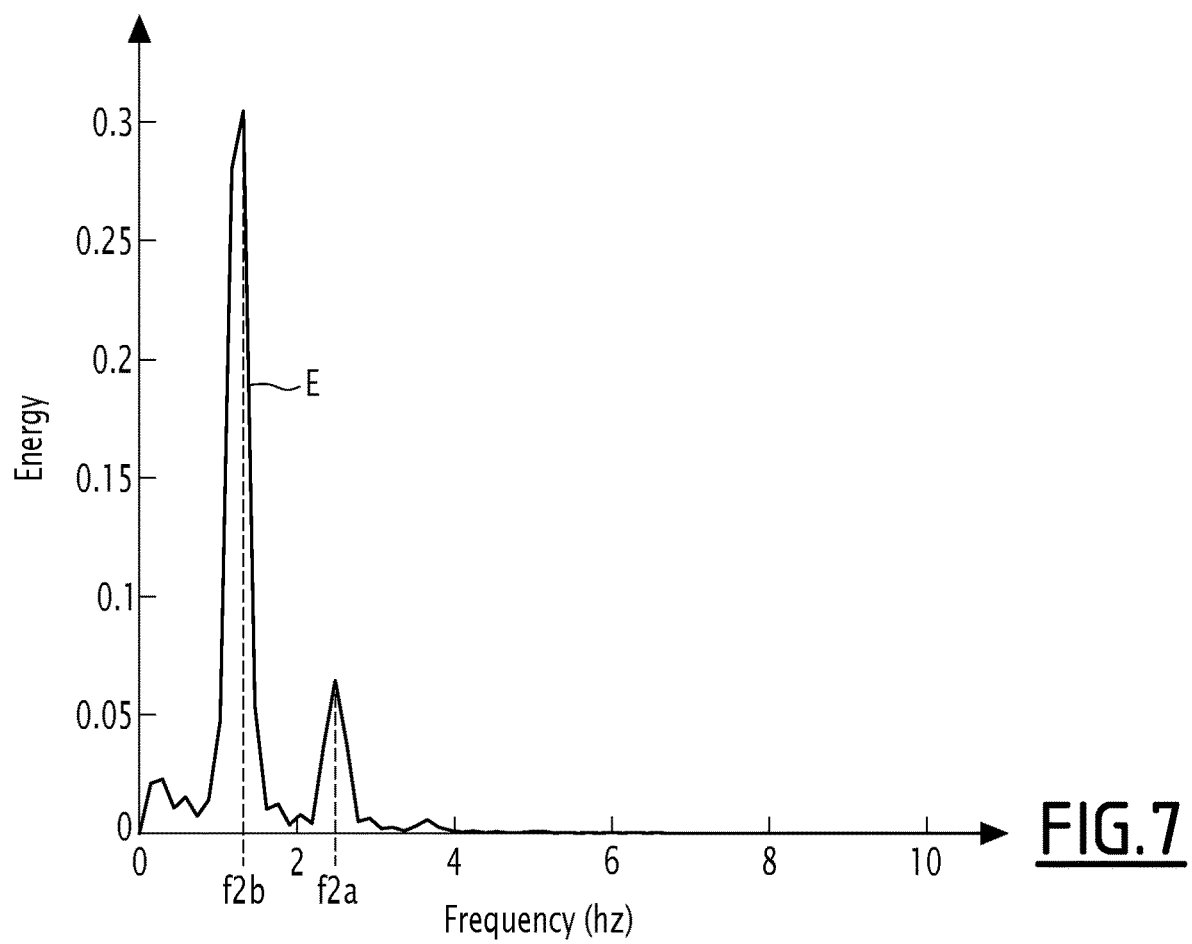
FIG. 7 is a spectrum representing the result of a Fourier transform of the temporal correlation profile of FIG. 6.

As shown on FIG. 7, the method of the invention includes a starting step 1000 where the method is initiated.

In a second step 1002, which forms a preliminary step, one obtains the dataset of images 40 by using the apparatus 2, as explained here-above. At the end of this step 1002, the dataset 40 is stored into the memory 38. In the meaning of the invention "obtaining" means deriving the dataset 40 from the output signals of the apparatus 2. This operation can be performed by a standard piece of equipment integrated to or associated with the computer unit 34, such as an acquisition board, a printed circuit and/or an analogous/digital converter.

Figure 2:
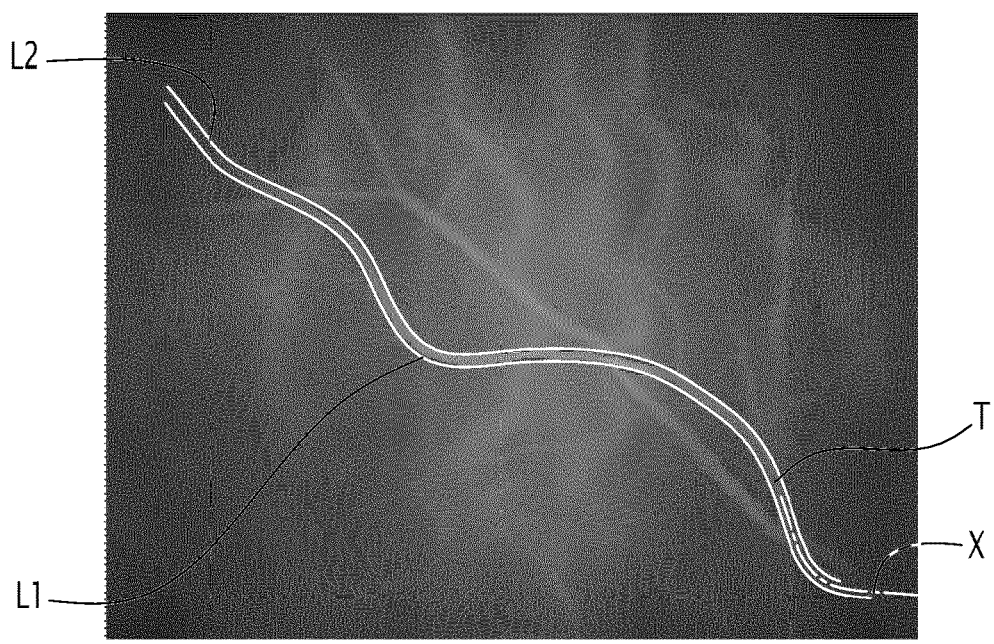
FIG. 2 is an example of an image obtained with a camera of the apparatus of FIG. 1.

An image Ij of the dataset 40 is visible on FIG. 2 where a tube T, an artery of the retina of a patient in this example, is represented by two lines L1 and L2 which correspond to the trace of a wall of the tube T in the plane of FIG. 2. X denotes a longitudinal axis of the tube T, which can be curved, as shown on FIG. 2.

The dataset 40 includes several images Ij showing a region of the retina R at different successive instants tj of a given period of time Δt, where j is an integer between 1 and the number of instants covered by the period of time Δt. The period of time Δt is the period during which the apparatus 2 is used for collecting images. It may range between several tenth of a second and several seconds. The time difference between two successive instants tj depends on the acquisition speed of the camera 30. In practice, the images acquired via the fast camera 30 are filtered a posteriori, which changes the temporal resolution of the apparatus 2. In this example, this temporal resolution can be set between 1 and 50 ms, preferably between 20 and 30 ms, most preferably equal to 27 ms.

For each image Ij of the dataset 40, lines L1 and L2 are identified in a step 1004 of the method. This takes place via an automatic analysis performed in the computer unit 34 where a zone of maximum gradient of intensity in the image is detected as the trace of the wall of the tube T in the plane of the image. Detecting these two lines L1 and L2 allows locating the wall inner surface ST of the tube T along this tube, together with its average diameter D along a portion on the tube to be studied.

This information is stored in the memory 38, in the form of a second dataset 42.

One considers a portion of the tube, e.g. a portion of a length of 5 mm.

In a further step 1006, the image of the portion of the tube T defined in the dataset 42 is divided, on each image Ij, into sections Sij, perpendicular to the axis X and distributed along this axis, with i an integer between 1 and N, where N is the number of sections of the tube portion. These sections Sij are identified during step 1006.

In each section Sij, the repartition of the blood speed can be derived from the images Ij of the dataset 40 and an average particle velocity Vij can be computed for this section Sij.

This occurs in a step 1008. This step 1008 takes place for every transverse section Sij and for every image Ij of the dataset 40, that is at every instant tj.

This step 1008 makes use of the result of the laser Doppler holography technique implemented in the preliminary step 1002.

This determination of the average particle velocity Vij of the blood over the sections Sij of the tube T at each instant tj allows identifying and measuring the speed of progression of an antisymmetric wave along the flexible tube T.

The present invention takes advantage of the fact that two types of waves can be identified in a flexible tube, where a pulsatile flow of liquid takes place.

Figure 3:
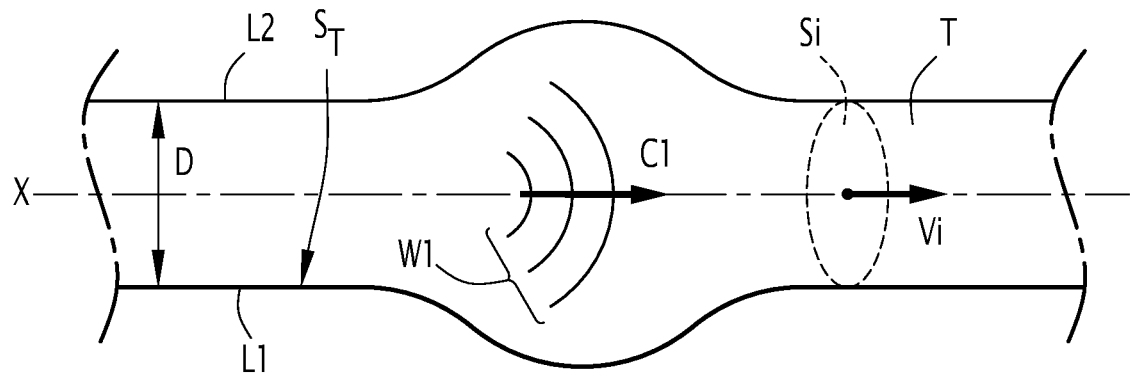
FIG. 3 is a schematic representation of the propagation of a symmetric wave within a tube represented on FIG. 2.

First, as shown on FIG. 3, a relatively fast wave W1 propagates along the longitudinal axis X of the tube T, which is supposed to be rectilinear, for the sake of simplicity. Such a fast wave W1 is symmetrical with regard to the axis X and induces local deformations of the inner surface ST of the tube, that is of lines L1 and L2, thus local variations of the diameter D. These deformations are symmetrical with respect to the axis X and occur in opposite directions with respect to this axis. In the example of a blood vessel, this relatively fast wave W1 moves at a speed between 0.1 m/s and 10 m/s, depending on its frequency. Such a symmetrical wave W1 is relatively difficult to show and measure.

C1 denotes the speed of propagation of the symmetrical wave W1 along the central axis X of the tube T.

Figure 4:
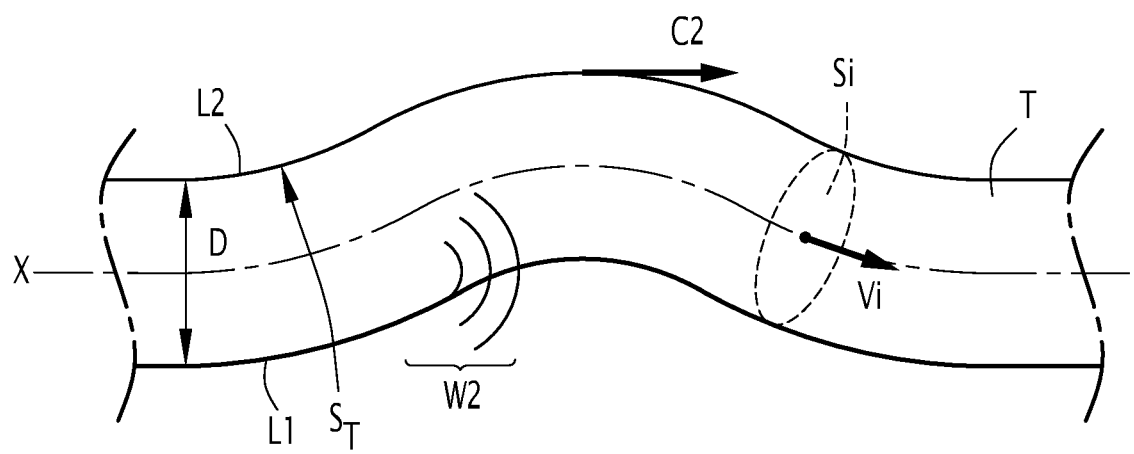
FIG. 4 is a schematic view similar to FIG. 3 for an antisymmetric wave.

As shown on FIG. 4, a relatively slow wave also propagates along the longitudinal axis X. Such a slow wave W2 is antisymmetric, with no cut-off frequency, and induces a lateral deformation or distortion of inner surface ST of the tube represented by the two lines L1 and L2, as shown on FIG. 4. This deformation occurs laterally in the same direction with respect to the axis X, for the two lines L1 and L2. On FIG. 4, C2 denotes the propagation speed of the antisymmetric wave W2. This propagation speed C2 is smaller than the propagation speed C1 at the same frequency, typically less than 5 m/s when propagation speed C1 equals 10 m/s.

The present invention focuses on the antisymmetric wave W2, which is easier to show and measure than the symmetric wave W1.

The wave propagation speed C2 is computed over the portion of the tube T including the sections Sij, with i between 1 and N and with j the instant number.

Figure 5:
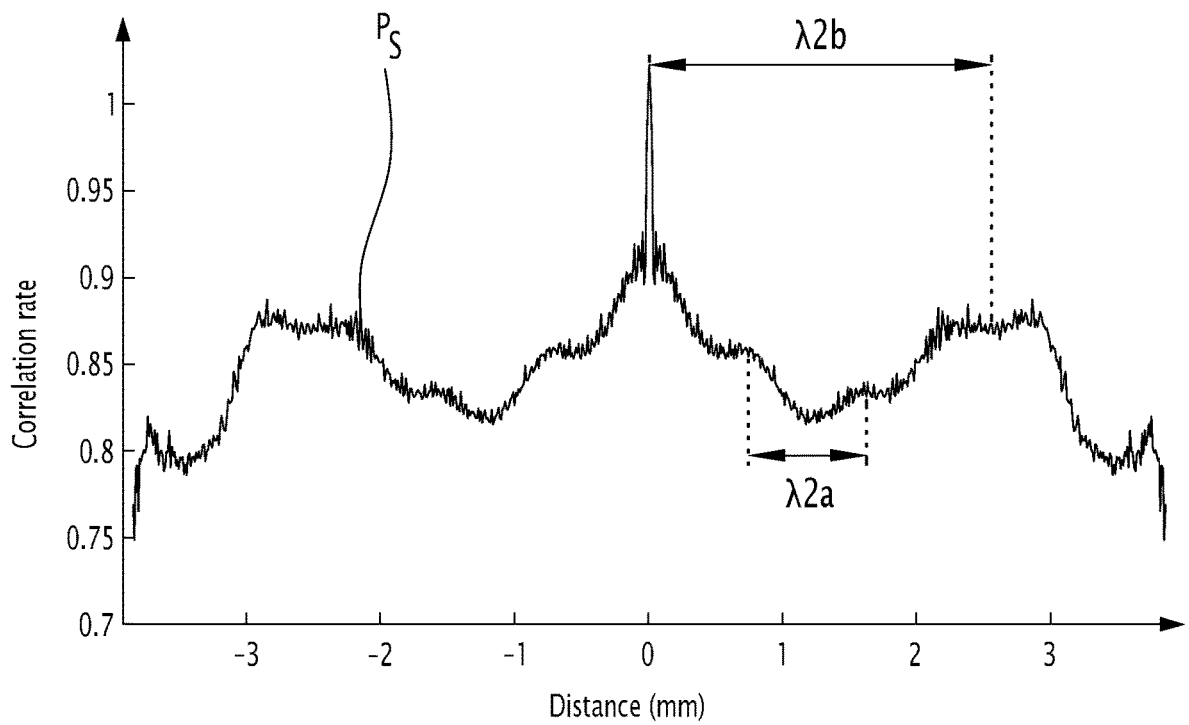
FIG. 5 is a spatial correlation profile of a wave propagation speed of an antisymmetric wave generated in a flexible tube.

In practice, the computation of the wave propagation speed C2 based on the average particle velocity Vij in each section Sij, takes place in a step 1010, with the following sub-steps:

In a first sub-step 1111, a spatial correlation profile $P_S$ is computed for a set of sections Sij. This correlation profile $P_S$ is represented on FIG. 5 and shows a correlation rate of the average particle velocities Vij in different points separated from a reference point by a distance measured in millimeters.

This correlation profile $P_S$ has a succession of peaks with two different wavelengths $\lambda 2a$ and $\lambda 2b$. These wavelengths are measured in a subsequent sub-step 1112 as distances between peaks on the correlation profile $P_S$. The first wavelength $\lambda 2a$ can be defined as a distance between two close peaks on the correlation profile $P_S$, whereas the second wavelength $\lambda 2b$ can be defined as a distance between two more remote peaks on the correlation profile $P_S$. The first wavelength $\lambda 2a$ is smaller than the second wavelength $\lambda 2b$.

In the example, the first wavelength $\lambda 2a$ determined during sub-step 1112 equals about 0.8 mm and the second wavelength $\lambda 2b$ equals about 2.5 mm.

Figure 6:
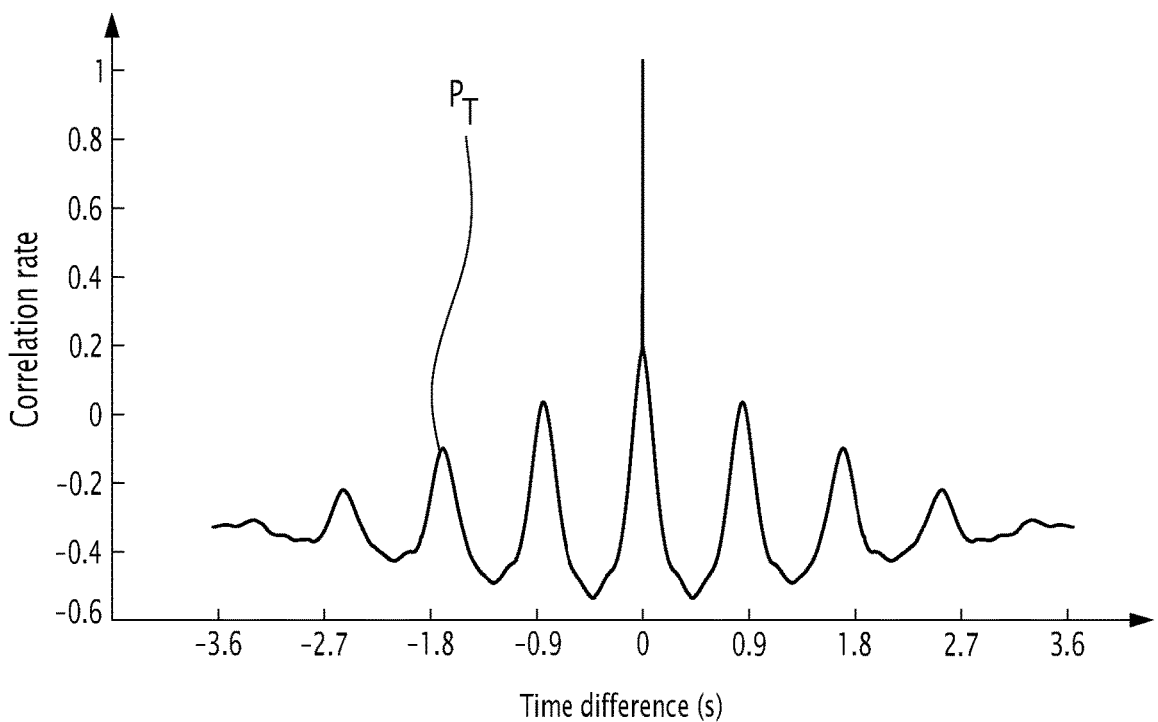
FIG. 6 is a temporal correlation profile of the same wave propagation speed.
Figure 8:
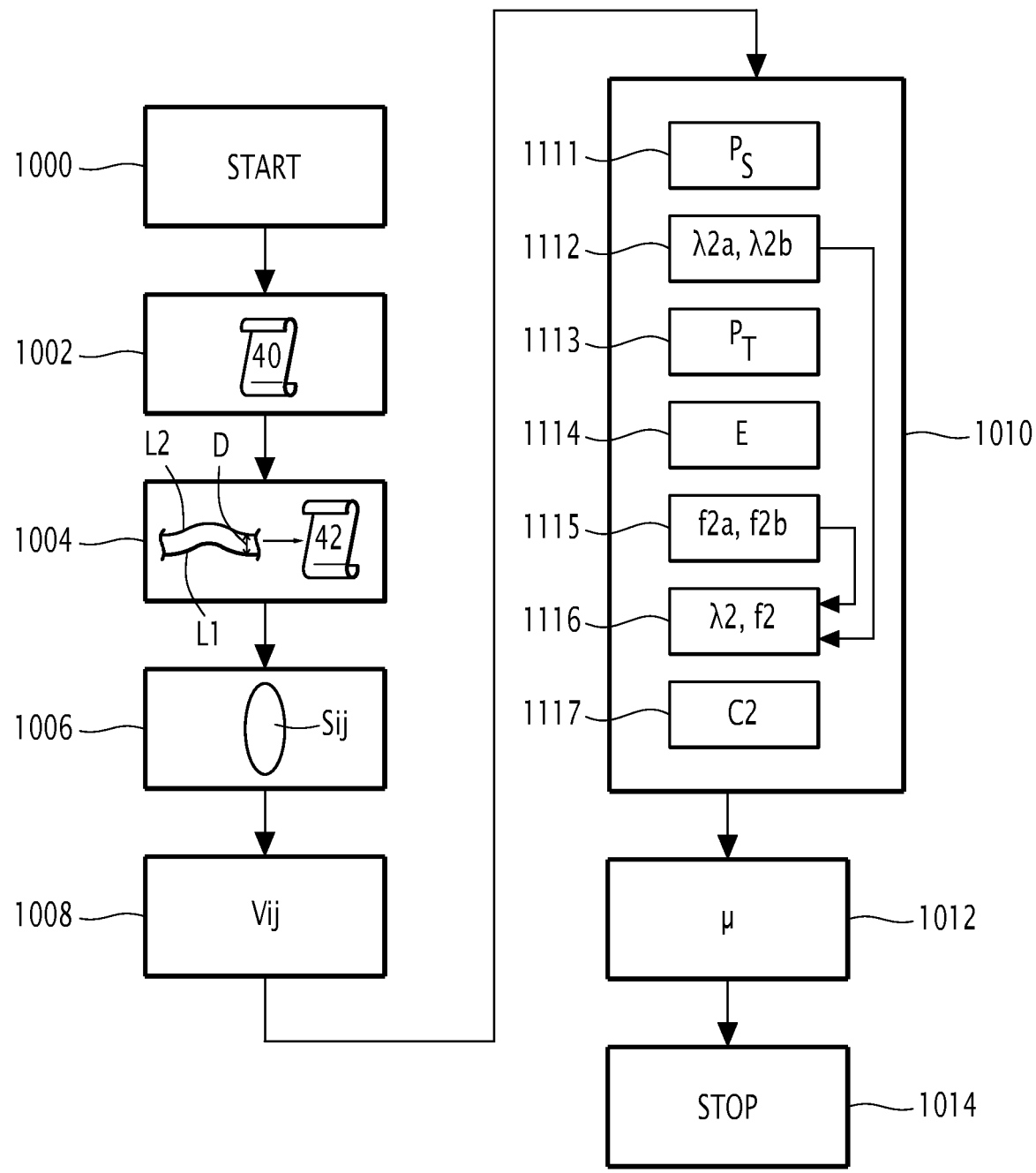
FIG. 8 is a block diagram of a method according to the invention.

In a further sub-step 1113, a temporal correlation profile $P_T$ is computed for the average particle velocity Vij and for the same set of sections Sij. This correlation profile is represented on FIG. 6 and gives a correlation rate with respect to a reference instant and as a function of a time difference expressed in seconds.

This temporal correlation profile $P_T$ has a succession of peaks.

In a subsequent sub-step 1114, a Fourier transform is used to convert the temporal correlation profile $P_T$ into an energy spectrum E showing the energy level of the temporal correlation profile $P_T$ as a function of the frequency of the wave given in Hertz (Hz), as shown on FIG. 7.

It is then possible to determine, in a further sub-step 1115 and based on the energy spectrum E, a first frequency f2a and a second frequency f2b corresponding respectively to the two wavelengths $\lambda 2a$ and $\lambda 2b$. These frequencies f2a and f2b are identified by peaks on the energy spectrum E. Moreover, the first frequency f2a is larger than the frequency f2b since the first wavelength $\lambda 2a$ is smaller than the second wavelength $\lambda 2b$.

In the example of FIG. 7, the frequencies f2a and f2b of the antisymmetric wave W2 are respectively about 2.5 Hz and 1.3 Hz.

The sub-steps 1112 and 1115 can take place one after the other, in any order, or at the same time.

Then, one selects, in a further sub-step 1116 one of the values f2a or f2b as a representative frequency f2 of the antisymmetric wave W2 and the corresponding wavelength $\lambda 2a$ or $\lambda 2b$ as the representative wavelength $\lambda 2$ of the antisymmetric wave W2.

Let us assume that value f2a is chosen as the representative frequency f2. Then wavelength $\lambda 2a$ is the representative wavelength \2.

Based on the representative values $\lambda 2$ and f2 determined at sub-step 1116, it is possible to compute, in a further sub-step 1117, the wave propagation speed C2 of the antisymmetric wave W2 by application of the following equation:

$$C2 = \lambda 2 \times f2 \qquad \text{(Equation 1)}$$

This wave propagation speed C2 is an average value for the portion of the tube T corresponding to the sections Sij.

Once this wave propagation speed C2 is known, it is possible to assess, for the same portion of the tube, a shear elasticity modulus u of the tube T in a further step 1012 implemented after step 1010.

During step 1012, one makes use of the following equation:

$$\mu = 76 \times C2^4 \times f2^{-2}/D^2 \qquad \text{(Equation 2)}$$

This equation 2 is derivable from the works of Lamb, cited in the book "Ondes élastiques dans les solides" by Royer and Dieulsant, (1996, chap 5, pages 280-289).

According to an alternative embodiment of the invention, the representative frequency and wavelength can be chosen respectively equal to f2b and $\lambda 2b$ in step 1116.

According to another alternative embodiment, only one wavelength $\lambda 2a$ or $\lambda 2b$ and only the corresponding frequency f2a or f2b are determined at sub-steps 1112 and 1115. In such a case, sub-step 1116 is not implemented and sub-step 1117 is implemented based on the values determined at sub-steps 1112 and 1115.

The invention is explained here-above in case the method is used for characterizing a blood vessel in the retina of a patient. This is particularly advantageous because laser Doppler holography is very efficient for obtaining a data set with images of the blood flow in such blood vessels. However, the invention is not limited to blood vessels in the retina and can be used for characterizing blood vessels of another part of the patient's body. In such a case, the dataset 40 can be obtained by laser Doppler holography or by another technique such as Doppler ultrasound.

Another equation, based on other assumptions, can also be used, instead of equation 2, in order to compute the shear elasticity modulus of the flexible tube T in step 1012.

Actually, equation 2 has proven to be relevant and applicable for biological tissues, in particular for blood vessels. However, as mentioned here-above, the invention can also be implemented for assessing a shear elasticity modulus of a flexible tube made of a non-biological tissue, such as an elastomer, for instance natural or synthetic rubber. In such a case, a pulsatile flow of liquid, which represents blood, is generated within the tube and steps 1000 to 1014 are adapted to the nature of the tube. This may be used for checking that a tube to be implanted in a patient's body is compatible with the natural tissues of this body, for instance in case a flexible tube is used for connecting an artificial organ to the vascular system of a patient.

For such a type of material and tube, and for many other applications, equation 2 can be replaced, for step 1012, by the following equation:

$$C2^2 = \frac{2\pi}{\sqrt{3}} \sqrt{\frac{\mu}{\rho}} \left(1 - \frac{\mu}{\alpha}\right)^{\frac{1}{2}} f2 \times D$$

with the same definition of the variables as mentioned here above, but for
- α, which is a compression elasticity modulus of the tube T; and
- ρ, which is the volume mass of the tube.

After step 1012, the method comes to a final end step 1014 where the value of the shear elasticity modulus u can be displayed on the screen of the computer unit 34 in order to be brought to the attention of a medical practitioner. During this final step 1014, the value of the shear elasticity modulus u may be stored in the memory 38, for further reference.

Thereafter, the method can be started again for another patient or for the second eye of the patient.

Based on his/her knowledge and experience, in particular with respect to standard values of the shear elasticity modulus, the practitioner can take the value computed at step 1012 into account for assessing the health condition of the patient. In particular, by comparing the value of the shear elasticity modulus u assessed at step 1012 for one or several blood vessel(s) with a set of reference values, gathered for patients with a known health condition, the practitioner can determine whether the patient is in good health or not.

The invention is not limited to a diagnostic approach insofar as the characterization of the tube, for example a blood vessel, is obtained without intervention of the medical practitioner since steps 1000 to 1014 are implemented automatically within the computer unit 34.

According to an alternative embodiment of the invention, step 1010 can be implemented by detecting, at a first instant t1, a first transverse section Si1, where the average particle velocity has a maximum value Vi1. One detects, at a second instant t2, a second transverse section Si2, where the average particle velocity has a maximum value Vi2. Then, the wave propagation speed C2 can be computed as the distance d12 between these two sections Si1 and Si2 divided by the time difference between these two instants t1 and t2, with the relationship expressed by the following equation:

$$C2 = d12/(t2-t1). \tag{Equation 4}$$

In case the invention is used to determine the elasticity of a tube formed by a volcano chimney and the fluid is lava, equation 3 or another adapted equation is used in step 1012.

The invention is explained here above in case the average particle velocity computed at step 1008 is the average particle velocity of the liquid of a pulsatile flow, e.g. due to heart pulse.

However, the invention can also be implemented in case the average particle velocity computed at step 1008 is an average particle velocity of the wall of the tube. This average particle velocity of the wall can be determined by comparing successive images of the tube, obtained by photography of the tube on a given period of time, without necessarily using a Doppler based technique.

In such a case, step 1002 may consist in obtaining a film of the spatiotemporal deformations of the tube, in particular by the "fundus technique".

In addition to the examples mentioned here above, the invention can be used for characterizing any flexible tube, natural or artificial, where a pulsatile flow of liquid take place or whose wall is locally and temporarily deformed for any reason.

The embodiments and variants of the invention may be combined to generate new embodiments of the invention, within the frame of the annexed claims.

The invention claimed is:

1. A process for characterizing a flexible tube, said process including at least the following further steps:
    a) obtaining with a camera a first dataset of image data relating to spatiotemporal deformations of the tube, on a given period of time;
    b) detecting a wall inner surface of the tube and its diameter and storing the corresponding data in a memory, in the form of a second dataset;
    c) identifying a number of transverse sections of the tube in the dataset;
    d) computing, for each section of the tube and at a given instant during the given period of time, an average particle velocity over this section;
    e) based on the average particle velocity computed at step d), computing a wave propagation speed of an antisymmetric wave generated in the tube by the liquid flowing within the tube;
    f) based on the wave propagation speed computed at step e) and on the diameter detected at step b), assessing a shear elasticity modulus of the flexible tube.

2. The process according to claim 1, wherein step b) is implemented by detecting a zone of maximum gradient of intensity in images of the set of image.

3. The process according to claim 1, wherein step e) is implemented by correlating some variations of the average particle velocity over a length of the tube or over time.

4. The process according to claim 3, wherein step e) includes at least the following sub-steps:
    e1) based on a spatial correlation scheme, determining at least one wavelength of the antisymmetric wave;
    e2) based on a temporal correlation scheme, determining at least one period of the antisymmetric wave;
    e3) based on the wavelength and period determined in sub-steps e1) and e2), computing the wave propagation speed.

5. The process according to claim 4, wherein the spatial correlation scheme of sub-step e1) has a succession of peaks and the wavelength is determined in sub-step e1) as a distance between two adjacent peaks.

6. The process according to claim 1, wherein step e) is implemented by detecting, at two different given instants, a transverse section where the average particle velocity has a maximum value and computing the wave propagation speed on the basis of the distance between the two detected transverse sections and a time difference between the two instants.

7. The process according to claim 1, wherein step f) consists in computing the shear elasticity modulus based on of the following equation:

$$\mu = 76 \times C2^4 \times f2^{-2}/D^2$$

where: C2 is the wave propagation speed of the antisymmetric wave W2;
f2 is a representative frequency of the antisymmetric wave; and
D is the diameter of the tube T.

8. The process according to claim 1, wherein step f) comprises computing the shear elasticity modulus based on of the following equation:

$$C2^2 = \frac{2\pi}{\sqrt{3}}\sqrt{\frac{\mu}{\rho}}\left(1 - \frac{\mu}{\alpha}\right)^{\frac{1}{2}} f2 \times D$$

where: C2 is the wave propagation speed of the antisymmetric wave W2;
f2 is a representative frequency of the antisymmetric wave;
α is a compression elasticity modulus of the tube;
ρ is the volume mass of the tube; and
D is the diameter of the tube T.

9. The process according to claim 1, wherein the data set obtained at the first step relates to a pulsatile flow of liquid flowing within the tube and is preferably implemented by laser Doppler holography or Doppler ultrasound.

10. The process according to claim 1, wherein the tube is a blood vessel and the liquid flowing within the tube is blood.

11. The process according to claim 10, wherein the blood vessel is located in the fundus of the eye and the step of obtaining the first dataset occurs through the lens of the eye.

12. The process according to claim 1, wherein the tube is a manufactured flexible pipe, configured to be implanted in a patient body for replacing a blood vessel.

13. The process according to claim 1, wherein the tube is a volcano chimney and the liquid flowing within the tube is lava.

14. An apparatus for implementing a method for characterizing a flexible tube, comprising:
a laser source emitting a laser beam;
a beam divider configured for dividing the laser beam between an illumination beam and a reference beam;
a set of converging lenses;
a polarizing beam splitter configured for illuminating a region where the flexible tube is located;
a beam splitter configured for combining a light backscattered by the flexible tube with the reference beam and forming a combined beam;
at least a camera configured for recording images formed in the combined beam and representative of spatiotemporal deformations of the flexible tube; and
a processing unit configured for implementing a method including at least the following steps:
a) recording with the camera a first dataset of images relating to spatiotemporal deformations of the tube, on a given period of time;
b) detecting a wall inner surface of the tube and its diameter and storing the corresponding data in a second dataset;
c) identifying a number of transverse sections of the tube in the dataset;
d) computing, for each section of the tube and at a given instant during the given period of time, an average particle velocity over this section;
e) based on the average particle velocity computed at step d), computing a wave propagation speed of an antisymmetric wave generated in the tube by the liquid flowing within the tube; and
f) based on the wave propagation speed computed at step e) and on the diameter detected at step b), assessing a shear elasticity modulus of the flexible tube.

15. The apparatus of claim 14, further comprising a memory configured for storing at least the first and second datasets.

16. A non-transitory computer-readable medium including a program comprising software instructions which, when executed by a computer, implement the process of claim 1.

* * * * *